(12) United States Patent
Kemp et al.

(10) Patent No.: US 10,862,799 B2
(45) Date of Patent: Dec. 8, 2020

(54) VIRTUAL BURN RACK MONITOR

(71) Applicant: DELL PRODUCTS, LP, Round Rock, TX (US)

(72) Inventors: Walter Kemp, Round Rock, TX (US); William P. Hyden, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 50 days.

(21) Appl. No.: 16/195,030

(22) Filed: Nov. 19, 2018

(65) Prior Publication Data

US 2020/0162379 A1    May 21, 2020

(51) Int. Cl.
*H04L 12/721* (2013.01)
*H04L 29/08* (2006.01)

(52) U.S. Cl.
CPC .............. *H04L 45/66* (2013.01); *H04L 67/10* (2013.01)

(58) Field of Classification Search
CPC . H04L 41/22; H04L 67/1072; G06F 9/45558; G06F 21/31
See application file for complete search history.

(56) References Cited

U.S. PATENT DOCUMENTS

| | | | |
|---|---|---|---|
| 6,247,126 B1* | 6/2001 | Beelitz | G06F 8/63 713/1 |
| 6,285,967 B1* | 9/2001 | Rajan | G06F 11/273 700/115 |
| 6,351,769 B1* | 2/2002 | King | H04L 43/50 709/224 |
| 6,477,486 B1* | 11/2002 | Ram | G06F 11/273 702/183 |
| 6,499,115 B1* | 12/2002 | Wiedeman | G06F 11/26 370/252 |
| 6,543,047 B1* | 4/2003 | Vrhel, Jr. | G06F 8/61 714/E11.208 |
| 6,651,093 B1* | 11/2003 | Wiedeman | H04L 12/4641 709/221 |
| 10,038,742 B2* | 7/2018 | Reddy | H04L 41/0806 |
| 2001/0037157 A1* | 11/2001 | Lawton | G05B 19/00 700/1 |
| 2002/0121913 A1* | 9/2002 | Miller | G01R 31/2874 324/750.05 |

(Continued)

*Primary Examiner* — Melanie Jagannathan
(74) *Attorney, Agent, or Firm* — Larson Newman, LLP

(57) ABSTRACT

A virtual burn rack monitor accesses messages posted to a cloud-based service. Each message provides any informational content sent from a device. The virtual burn rack monitor downloads the message and determines a manufacturing environment for the device. For example, the virtual burn rack monitor uses a hardware identifier of the device to a customer's configuration service. Once the customer is determined, the cloud-based service sends the message to the manufacturing environment assigned to, or associated with, the customer. The message may, as another example, be forwarded or sent to a burn rack operating within a manufacturing facility that is assigned to that customer. The message may thus be displayed to technicians and other personnel on the manufacturing floor. So, even though the device is remotely located from the manufacturing facility, the device may update the technicians as to its status and operating conditions.

20 Claims, 14 Drawing Sheets

(56) References Cited

U.S. PATENT DOCUMENTS

| | | | |
|---|---|---|---|
| 2003/0028629 A1* | 2/2003 | Amro | G06F 8/60 709/222 |
| 2003/0084297 A1* | 5/2003 | Spain | G06F 21/31 713/176 |
| 2003/0105542 A1* | 6/2003 | Arnold | G06Q 10/06 700/102 |
| 2005/0055688 A1* | 3/2005 | Barajas | G06F 8/63 717/174 |
| 2019/0230156 A1* | 7/2019 | McLarty | H04L 41/22 |
| 2019/0332507 A1* | 10/2019 | Tumuru | G06F 11/263 |

* cited by examiner

VIRTUAL BURN RACK MONITOR

FIELD OF THE DISCLOSURE

This disclosure generally relates to information handling systems, and more particularly relates to virtual burn rack monitors.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, server systems, data storage systems, and networking systems.

SUMMARY

A dynamic burn slot monitor accesses messages posted to a cloud-based service. The messages describe a media access control address associated with a device installed in a burn slot. The dynamic burn slot monitor downloads the messages from the cloud-based service and determines a virtual private network that is associated with the media access control address. The dynamic burn slot monitor also determines a switch port in a network switch that corresponds to the virtual private network, and dynamically assigns the switch port that corresponds to the virtual private network to the device installed in the burn slot. The dynamic burn slot monitor instructs the network switch to route packets of data associated with the virtual private network via the switch port to the device installed in the burn slot.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
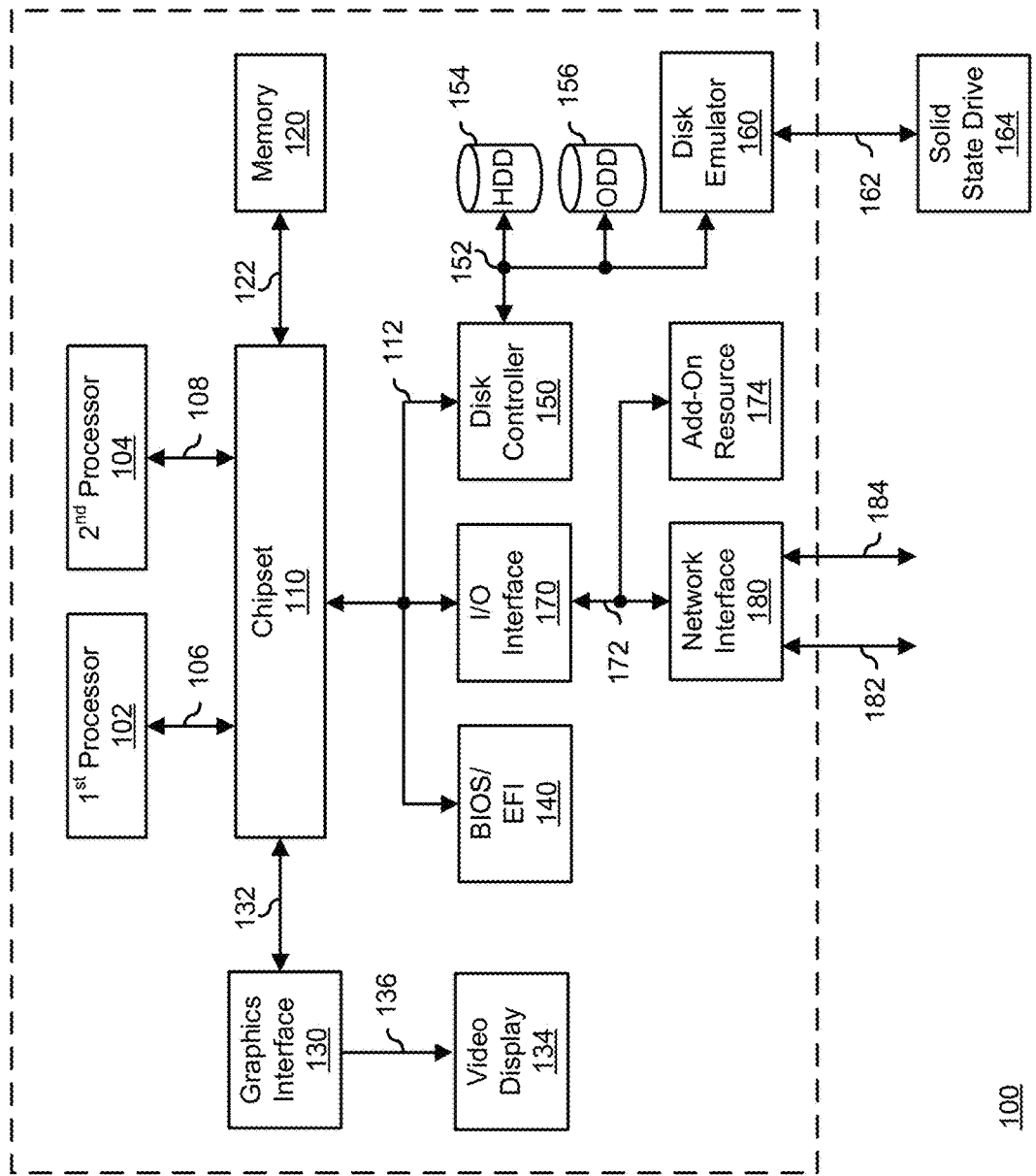
FIG. 1 is a block diagram illustrating a generalized information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a server system, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an I/O interface 170, and a network interface 180. Processor 102 is connected to chipset 110 via processor interface 106, and processor 104 is connected to the chipset via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174, to a TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
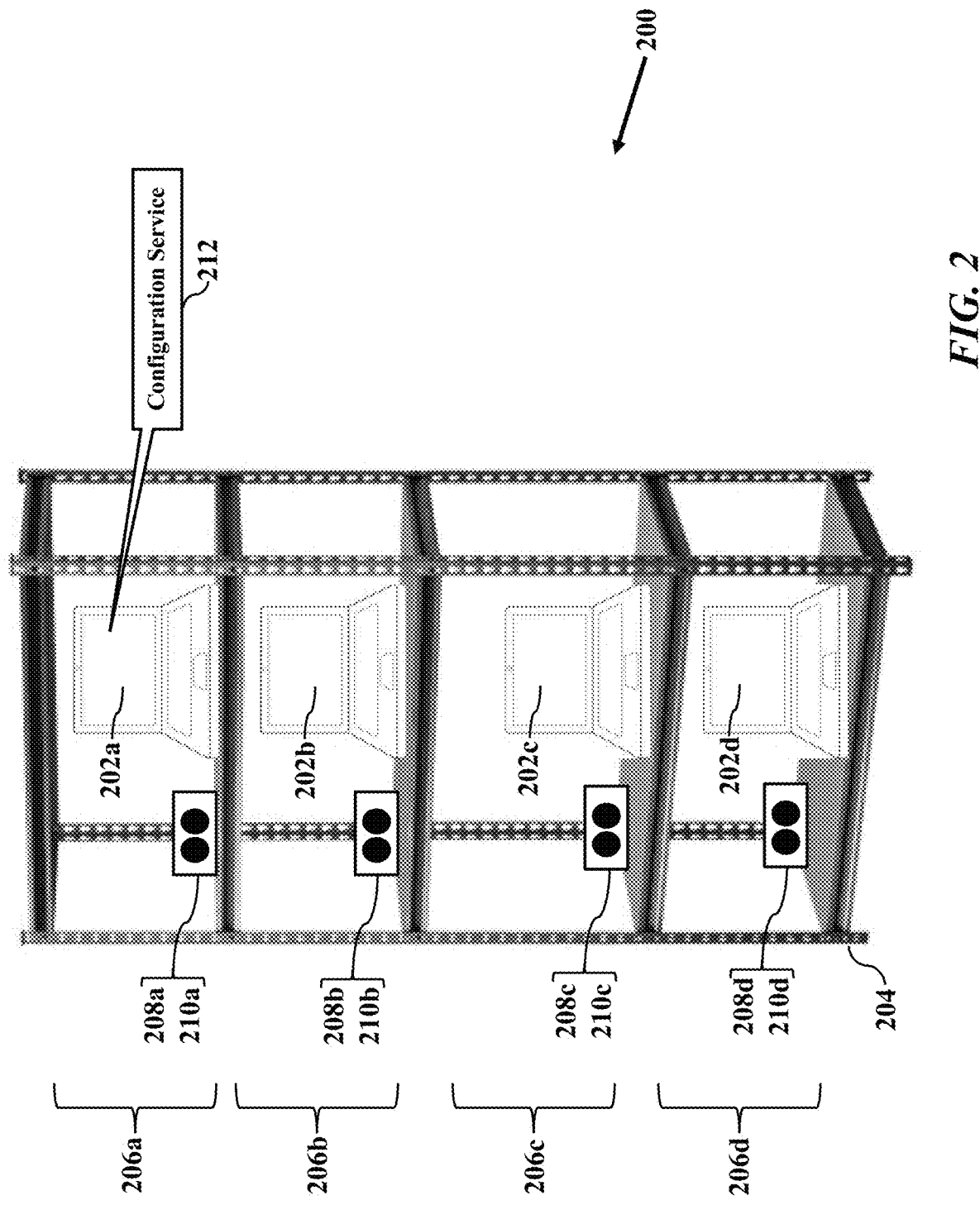
FIGS. 2-3 illustrate dynamic burn slot allocation, according to exemplary embodiments.
Figure 3:
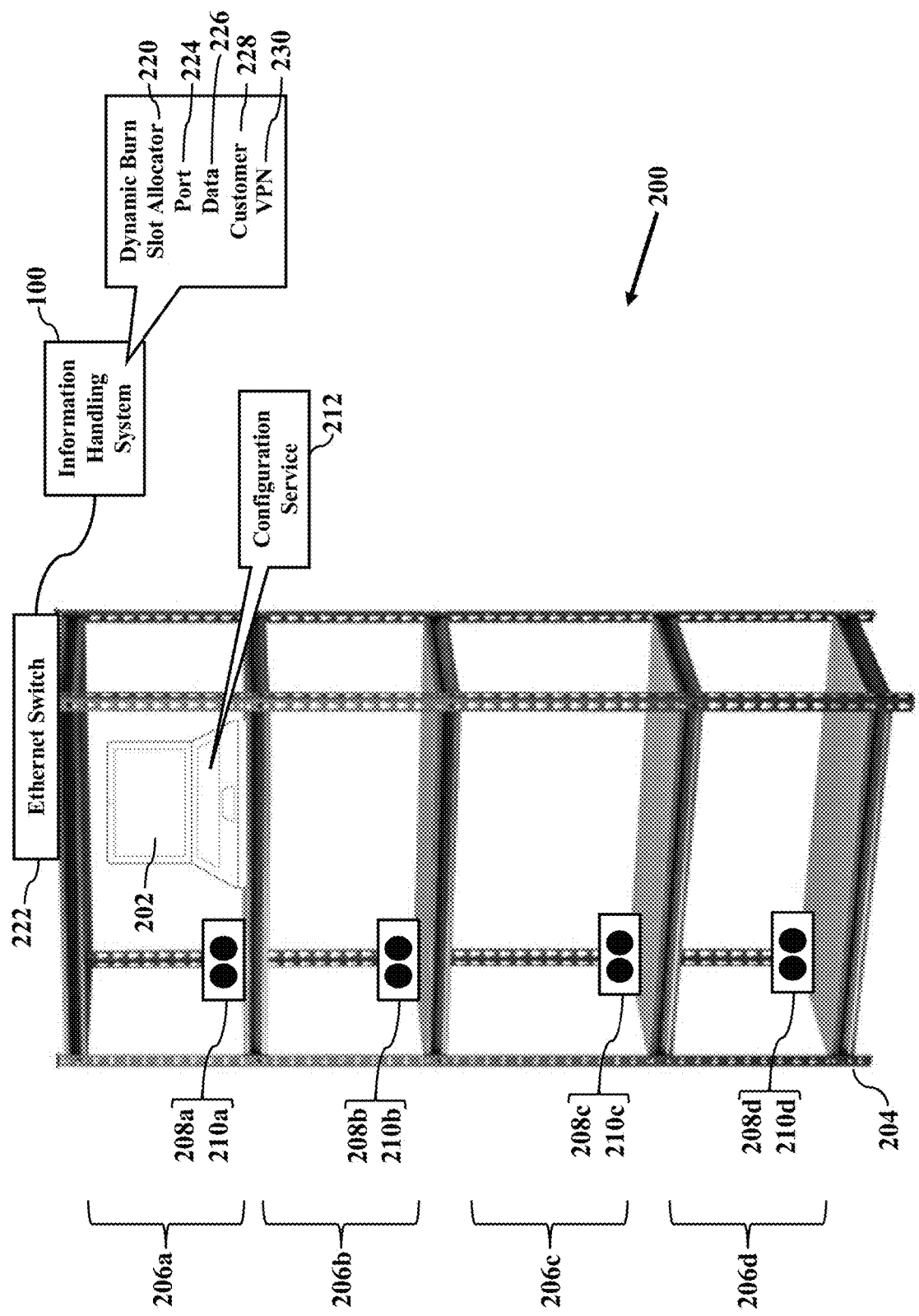

FIGS. 2-3 illustrate dynamic burn slot allocation, according to exemplary embodiments. A production facility 200 manufactures and/or assembles any processor-controlled device. While the production facility 200 may assemble any desktop, tablet, or other mobile or stationary platform, FIG. 2 illustrates a laptop computer 202. The production facility 200 acquires all the individual or separate components (such as the components illustrated in FIG. 1) and assembles the components as the laptop computer 202. After the laptop computer 202 is assembled, the laptop computer 202 may be placed or loaded into a burn rack 204. The burn rack 204 generally resembles a conventional storage rack or shelving unit for supporting one or more of the laptop computers 202. The burn rack 204 is used to preconfigure the laptop computer 202. That is, after the laptop computer 202 is sold to a customer, but prior to shipment to the customer, the manufacturer or seller of the laptop computer 202 may preconfigure the laptop computer 202 to suit the customer's specification(s).

The burn rack 204 has burn slots 206. Each burn slot 206 has its own electrical power supply 208 and networking connection 210. While the burn rack 204 may have any number of burn slots 206, FIG. 2 illustrates a simple example of four (4) burn slots 206a-d. Each burn slot 206a-d is capable of accepting and configuring a corresponding one of the laptop computers 202a-d. A technician loads (or enters) the laptop computer 202 into an available one of the burn slots 206 and connects the corresponding electrical power supply 208 and networking connection 210. Once electrical power and a network connection is established, the technician turns on or boots the laptop computer 202.

Configuration may then begin. The production facility 200 provides a configuration service 212 to the laptop computer 202. The production facility 200 hosts the customer's systems management tools as a technical service provider. Because each burn slot 206 has its own networking connection 210, the burn slot 206 may connect to the customer's hosted environment. The laptop computer 202 connects into the customer's infrastructure for the application of services (such as imaging, bios changes, or domain joins).

Exemplary embodiments dynamically assign the burn slots 206. Each burn slot 206 may change its configuration service 212 according to the customer. That is, each burn slot 206 may be locally and dynamically assigned to any customer according to usage, need, geographic location, or any other parameter. Conventional configuration services were implemented by allocating a specific set of the burn racks to a specific customer. This static allocation, though, is inefficient, as many burn slots go unused until the customer has an active order. Additionally, if a customer places a large order, the time to fulfill is increased due to the static set number of the burn slots that are assigned to that customer. Moreover, human error allows the opportunity for the laptop 202 to be placed into the wrong burn slot and vice versa, thus loading an incorrect configuration. Exemplary embodiments, instead, dynamically assign the burn slot 206 to any customer, thus allowing the configuration of any customer's laptop computer 202 according to the customer's desired configuration service 212.

FIG. 3 thus illustrates a dynamic burn slot allocator 220. The dynamic burn slot allocator 220 is a processor-based mechanism that dynamically assigns partitioned environments, which may include computing and networking resources, to customers, based on need, usage, geographic location, or any other parameter. While the dynamic burn slot allocator 220 may be embodied in any processor-controlled system or device, FIG. 3 illustrates an Ethernet switch 222 interfacing with the information handling system 100. The Ethernet switch 222 has wired, physical ports 224 and/or a wireless interface to each one of the networking connections 210 in the burn slots 206. Again, while the Ethernet switch 222 has the port 224 and/or a wireless interface to each one of the networking connections 210 in the burn slots 206, FIG. 3 only illustrates the single laptop computer 202 communicating via the Ethernet 224. The Ethernet switch 222 enables Ethernet communication with the laptop computer 202 placed in the burn slot 206. After the laptop computer 202 starts/boots/operates, the laptop computer 202 sends data 226 via the networking connection 210 and physical cabling to the port 224 in the Ethernet switch 222 (or via wireless networking). The Ethernet switch 222 may then interface with the dynamic burn slot allocator 220 operating in the information handling system 100 and utilize the data 226 to determine the particular customer 228 that purchased the laptop computer 202. Once the customer 228 is determined, the dynamic burn slot allocator 220 instructs the Ethernet switch 222 to physically and/or logically connect the port 224 to the customer's partitioned environment. Again, while the customer's partitioned environment may be any project specific environment and/or isolated network, a virtual private network (or "VPN") 230 is thought familiar to most readers. The Ethernet switch 222, in other words, establishes a networking connection between the customer's virtual private network 230 and the port 224, the networking connection 210 in the burn slot 206, and the Ethernet connection/port and Ethernet interface operating in the laptop computer 202. The Ethernet switch 222 thus connects the laptop computer 202 to the customer's hosted environment and infrastructure, thus allowing the laptop computer 202 to receive the customer's specific configuration service 212.

Figure 4:
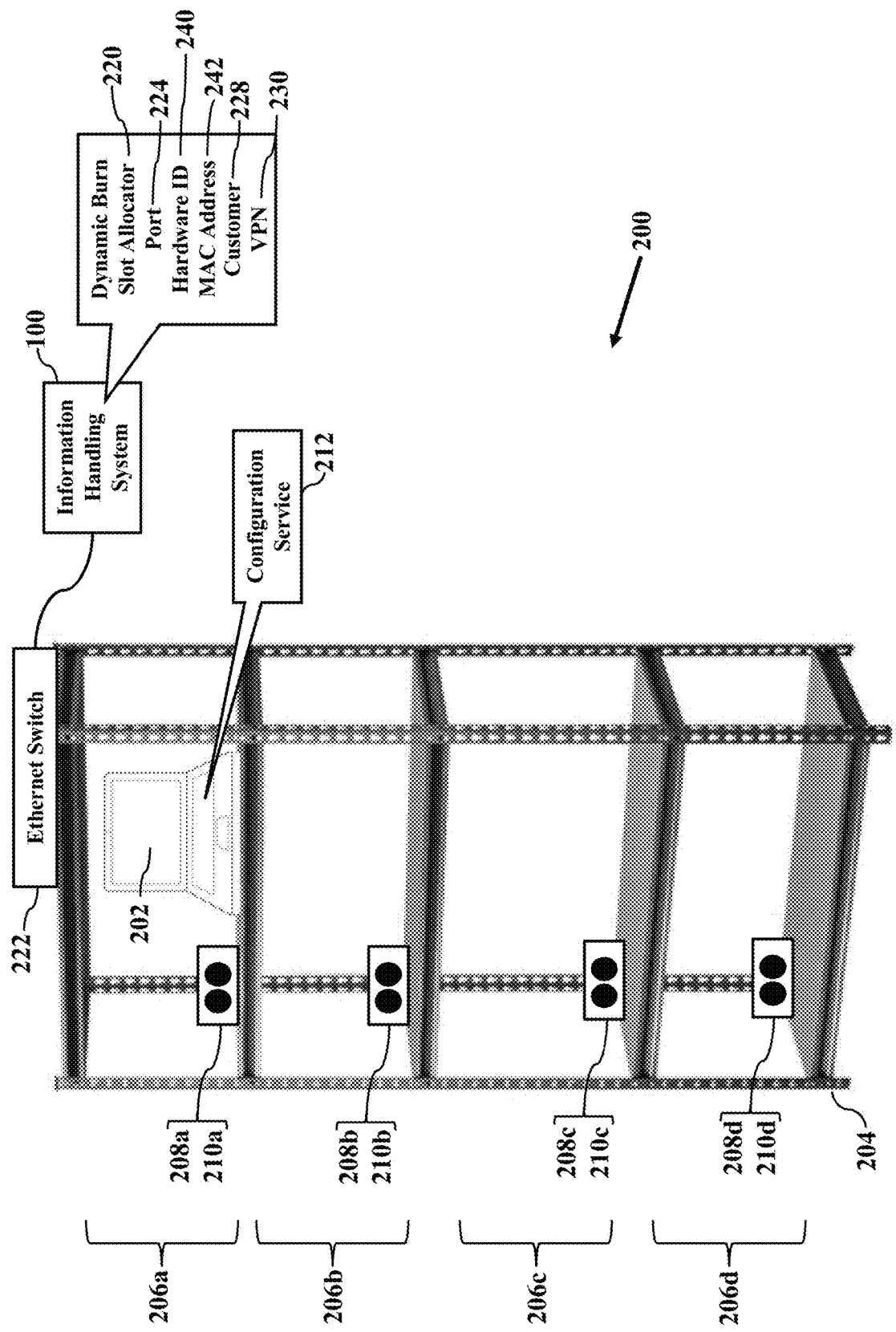
FIG. 4 further illustrates dynamic burn slot allocation, according to exemplary embodiments.

FIG. 4 further illustrates dynamic burn slot allocation, according to exemplary embodiments. As the above paragraphs explained, the dynamic burn slot allocator 220 utilizes the data 226 to determine the customer 228 and the customer's virtual private network 230. While any data 226 may be used to identify the customer 228, FIG. 4 illustrates a hardware identifier (or "Hardware ID") 240 and a media access control (MAC) address 242. The hardware identifier 240 is a serial number, unique alphanumeric combination, hash value, key, or other ASCII string that is assigned to the laptop computer 202 as a unique indicator from all other Internet-accessible servers and devices. The MAC address 242 is another unique alphanumeric combination that is assigned to a network interface controller, such as an Ethernet interface operating in the laptop computer 202 or operating in the Ethernet switch 222. Regardless, once the hardware identifier 240 and the MAC address 242 are received, the dynamic burn slot allocator 220 may then dynamically assign the customer 228 to the laptop computer 202 using the hardware identifier 240 and the MAC address 242.

Exemplary embodiments provide dynamic switching among virtual local area networks 230. The Ethernet switch 222 may have an Ethernet controller as a physical or virtual Ethernet switching component. Once the hardware identifier 240 and the MAC address 242 are determined, the dynamic burn slot allocator 220 provides an ability to switch the particular customer's virtual local area network (for example the VPN connection 230) for a network switch port dynamically. The process begins when a customer's configuration or project (perhaps represented by the hardware identifier 240) is acquired, perhaps along with the assigned VLAN for the project (perhaps represented by the MAC address 242). When any customer's device (such as the laptop computer 202) is associated with the project, exemplary embodiments gather the hardware identifier 240 and the MAC address 242 for the system under test (SUT) (such as the laptop computer 202). Then each SUT is provisioned on the appropriate VLAN for the order/project. When the laptop computer 202 is connected to or communicating with the Ethernet switch 222, the Ethernet switch 222 may utilize any communications protocol (such as any of the IEEE 802 family of networking standards) to determine the VLAN for the MAC address 242 and its corresponding switch port 224. If the MAC address 242 and/or switch port 224 does not have an assigned VLAN, then the SUT will be put in a quarantine VLAN where the system will use a manufacturing operating system to gather the MAC address 242 from the SUT and place it on the appropriate VLAN. This is a new automated process that is designed to replace the current manual process.

Exemplary embodiments thus provide many advantages over conventional schemes. Exemplary embodiments increase burn rack efficiency as well as ensure that systems are placed into the proper location. Moreover, exemplary embodiments provide a new capability to change the customer's environment without physically reconfiguring the burn slot 206 or system under test. For example, a system could be in a customer environment for any configuration change, and then be placed into a different customer environment for final configuration. Dynamic burn slot allocation has the capability to assign the burn slot 206 to many types of environments including: virtualized customer environments that reside within the manufacturing facility, hardware-enabled customer environments within the manufacturing facility, cloud hosted customer environments, and customer hosted environments. Dynamic burn slot allocation additionally provides the capability to utilize multiple hardware environments.

Exemplary embodiments thus allocate the burn slot 206 at the time of need. This dynamic allocation allows the manufacturing floor to operate more efficiently and also prevents human error. This dynamic connected configuration capability covers connectivity both from a customer site to manufacturing and vice versa as variations of a connected config offer.

Exemplary embodiments overcome the problems of conventional static schemes. Each burn slot 206 may change its configuration service 212 according to the customer. If a floor operator places the laptop computer 202 in the wrong section of burn slots thereby placing it with a different customer's environment, the Dynamic Burn Slot Allocator 220 alleviates these challenges by dynamically assigning the burn slot 206 to the proper customer environment. When the laptop computer 202 enters the burn rack 204, its hardware characteristics (e.g., the hardware identifier 240 and the MAC address 242), are mapped to the order which allows the Dynamic Burn Slot Allocator 220 to determine which customer environment is appropriate. Through the use of VLANs, the burn slot 206 is assigned to the appropriate environment. This allows for easy elasticity in the number of slots 206 assigned to a particular customer 228, which alleviates unused burn slots, and allows for an order to use the entire burn rack environment if needed. Because the Dynamic Burn Slot Allocator 220 is fully automated, the potential for human error is greatly reduced. A burn rack operator can place the laptop computer 202 into any burn slot 206, and the slot 206 will automatically be assigned to the correct customer environment.

Dynamic burn slot allocation is more efficient. Today's computer manufacturers are increasingly hosting services on behalf of the customers 228. For example, some manufacturers host their customer's systems management tools within the manufacturing factory 200 or within a technical service provider. The customer 228 may then connect (via the network connection 210 and the Ethernet switch 222) into its hosted computing environment. The laptop computer 202 connects into this infrastructure for the application of services such as imaging, bios changes, or domain joins. This manufacturer hosting service is conventionally implemented by allocating a specific set of burn racks to a specific customer. This conventional implementation, however, results in some or several of the burn racks 204 and/or the slots 206 being unused during light loading or orders and slow times to fulfill during heavy loading or orders.

Exemplary embodiments improve efficiency for faster responses. Dynamic burn slot allocation dynamically assigns the burn slot 206 to the proper customer environment. When any customer device (such as the laptop computer 202 or a server) is installed in the burn slot 206, exemplary embodiments may dynamically map its hardware characteristics (e.g., the hardware identifier 240 and the MAC address 242) to the customer 228. Dynamic burn slot allocation thus allows for easy elasticity in the number of slots 206 assigned to a particular customer 228, which alleviates unused burn slots 206, and even allows for a customer's order to use the entire burn rack 204 environment if needed. Because exemplary embodiments are fully automated, the potential for human error is greatly reduced. A burn rack operator may place any customer device into any burn slot 206, and the slot 206 will automatically be assigned to the correct customer 228.

Figure 5:
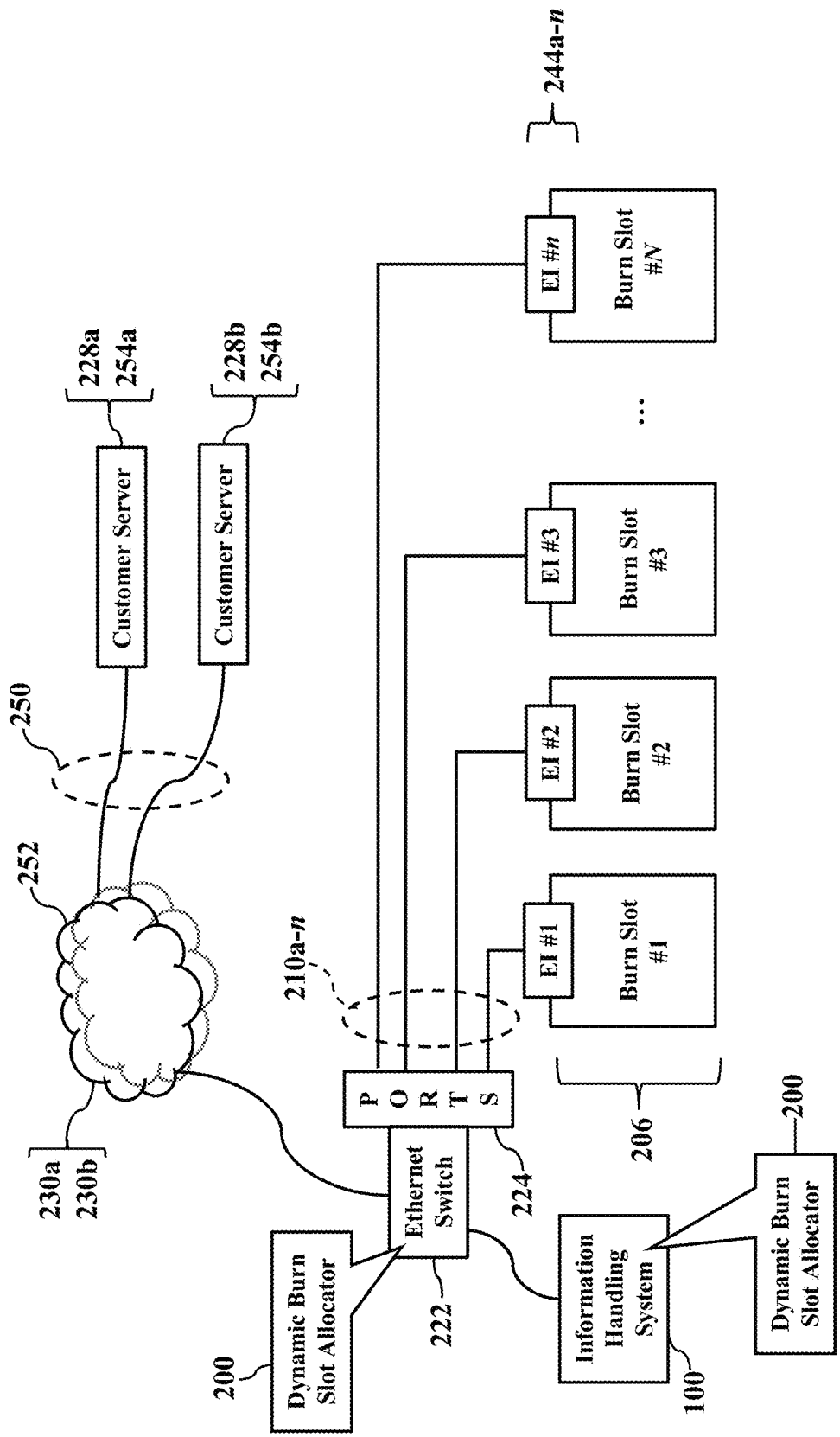
FIG. 5 illustrates Ethernet networking, according to exemplary embodiments.

FIG. 5 illustrates Ethernet networking, according to exemplary embodiments. As this disclosure above explains, each burn slot 206 has its own network connection 210 to one of the ports 224 in the Ethernet switch 222. While exemplary embodiments may use any networking technology, most readers are thought to be familiar with Ethernet networking. Each burn slot 206 may thus have a hardwired, physical, dedicated Ethernet connection 210 via an Ethernet Interface (or "EI") 244 to a corresponding switch port 224 of the Ethernet switch 222. Each Ethernet Interface 244 may also utilize a wireless interface (such as a wireless local area network connection). The Ethernet switch 222 inspects and routes packets of data to the correct port 224.

Dynamic allocation may occur. The Ethernet switch 222 interfaces with the information handling system 100. The dynamic burn slot allocator 220 may be a software application, programming code, or set of instructions that causes the Ethernet switch 220 to select the appropriate port 224. For example, switch-side portion of the dynamic burn slot allocator 220 may store within, and be executed by, a processor operating in the Ethernet switch 222. Another controller-side portion of the dynamic burn slot allocator 220 may store within, and be executed by, the processor(s) 102/104 (illustrated in FIG. 1) operating in the information handling system 100. The Ethernet switch 220 and the information handling system 100 may thus cooperate in a master/slave or client-server scheme to dynamically assign the burn slots 206 to different customers via the Ethernet switch 222. Each burn slot 206 may be dynamically assigned to different customers according to usage, need, geographic location, or any other parameter. For example, each customer 228 accesses the Ethernet switch 222 via a network connection 250 to a communications network 252. FIG. 5 illustrates a customer server 254 operated by, or on behalf of, the customer 228. While each burn slot 206 may serve many customers, for simplicity FIG. 5 only illustrates two (2) customer servers 254a-b associated with or representing corresponding customers 228a-b. While the network connection 250 may utilize any wired or wireless technology or standard, exemplary embodiments preferably utilize each customer's supplied networking environment (such as its respective virtual private network (or VPN) connection 230a-b). As the reader may understand, the customer server 254 executes a VPN client software application that encrypts data and sends encrypted data to an intermediate VPN server (not shown for simplicity). The VPN server then sends the encrypted data via the VPN connection 230 to the network address (or IP address) associated with the Ethernet switch 222. Regardless, exemplary embodiments may locally select and connect the burn slot 206 to the customer's VPN connection 230.

Figure 6:
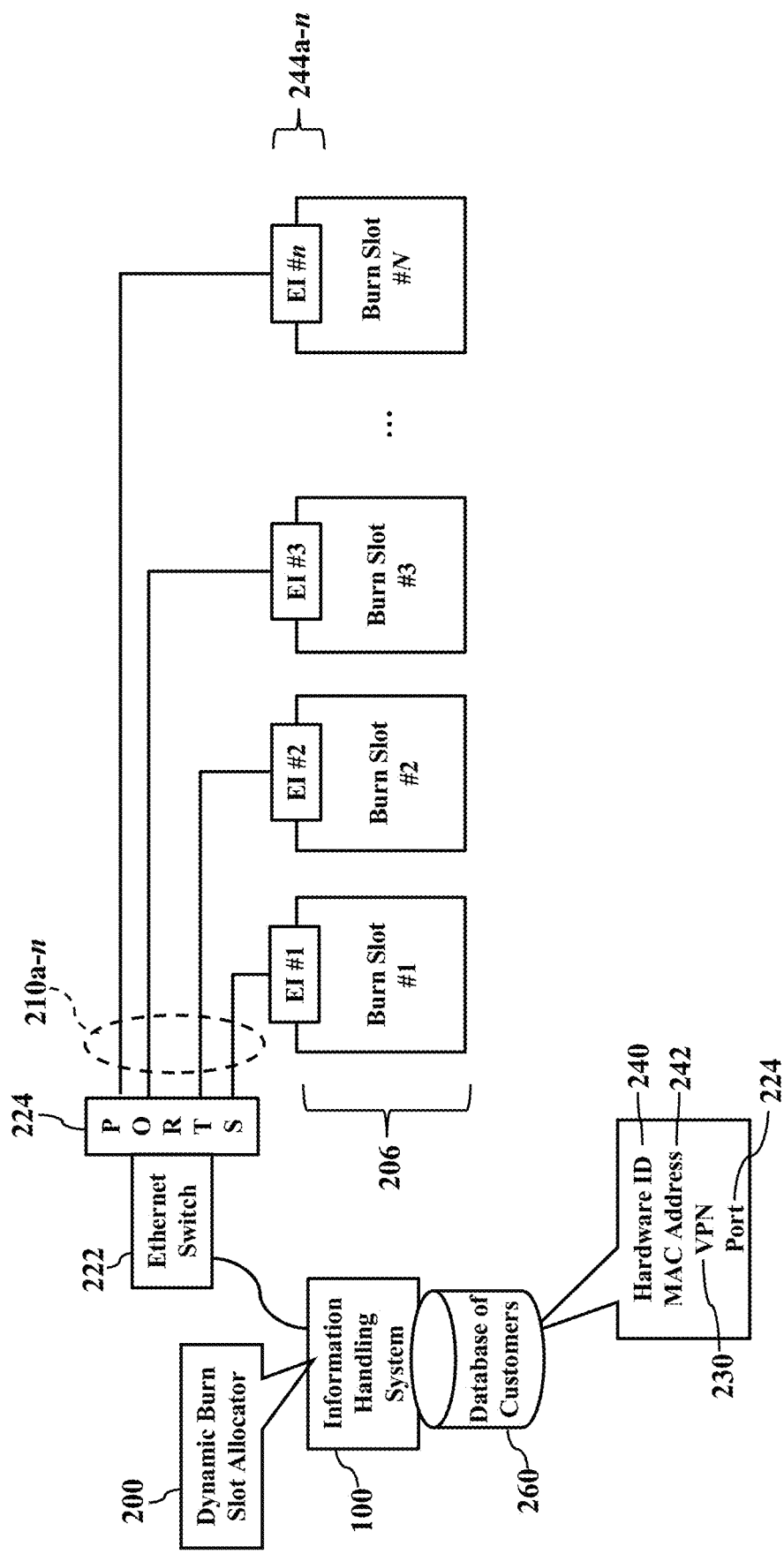
FIGS. 6-7 illustrate port selections, according to exemplary embodiments.
Figure 7:
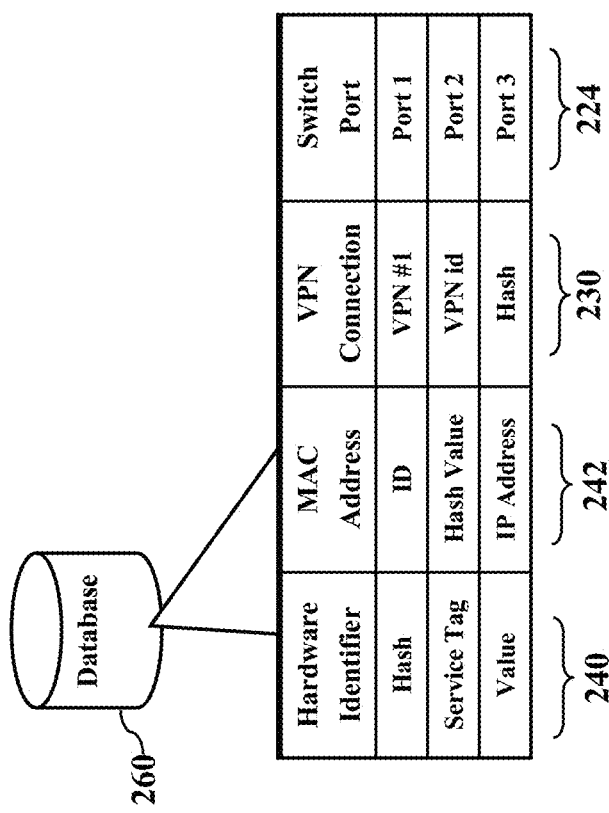

FIGS. 6-7 illustrate port selections, according to exemplary embodiments. Because exemplary embodiments may provide dynamic switching, exemplary embodiments may maintain relationships between different virtual local area networks and the different burn slots 206 available for task assignments. Again, while the dynamic burn slot allocator 220 may operate within any component, FIG. 6 illustrates at least a portion of the dynamic burn slot allocator 220 as a software application or algorithm that is stored and executed by the information handling system 100. When the Ethernet switch 222 and/or the information handling system 100 receives or otherwise determines the hardware identifier 240 and the MAC address 242, the dynamic burn slot allocator 220 may instruct the information handling system 100 to query an electronic database 260. The electronic database 260 maintains a mapping of the hardware identifier 240 and/or the MAC address 242 to their corresponding VPN connection 230 and switch port 224.

FIG. 7 illustrates the electronic database 260. While the electronic database 260 may have any structure, a relational database is thought easiest to understand. FIG. 7 thus illustrates the electronic database 260 as a table that maps, relates, or otherwise associates different hardware identifiers 240 and MAC addresses 242 to their corresponding VPN connections 230 and switch ports 224. The dynamic burn slot allocator 220 queries for the hardware identifier 240 and/or the MAC address 242 to identify the corresponding VPN connection 230 and/or switch port 224. The information handling system 100, of course, may query for any entry and identify its corresponding entries. Regardless, once the customer's VPN connection 230 is identified (such as its unique identifier), the corresponding switch port 224 in the Ethernet switch 222 is also identified. The dynamic burn slot allocator 220 may then instruct the Ethernet switch 222 to route any packets of data associated with, or even specifying, the VPN connection 230 to the switch port 224 and, thus, to the corresponding burn slot 206. Exemplary embodiments may thus interface with the Ethernet switch 222 to populate the entries in the electronic database 260 as a library of line status of each port 224. The customer's virtual private network (or VPN connection 230) may then be determined using the hardware identifier 240, the MAC address 242, and/or the switch port 224.

Figure 8:
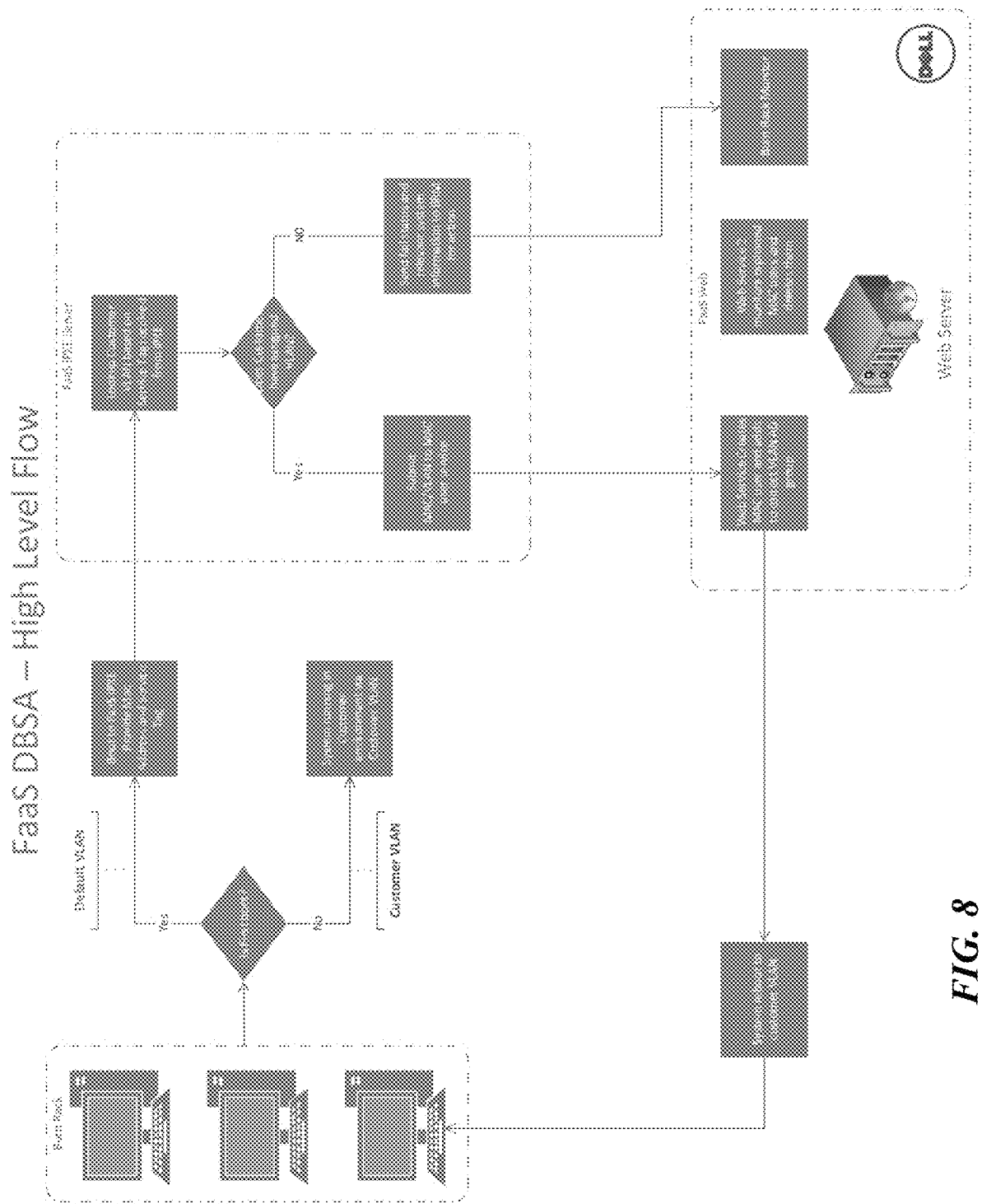
FIG. 8 illustrates a high-level overview of dynamic burn slot allocation, according to exemplary embodiments.

FIG. 8 illustrates a high-level overview of the dynamic burn slot allocator 220, according to exemplary embodiments. When the customer device (such as the laptop computer 202 or a server) is first booted, the hardware identifier 240 and/or the MAC address 242 is obtained. The customer's virtual private network (or VPN connection 230) is determined (perhaps by querying the electronic database 260 of customers, as above explained). If the customer has an assigned VLAN, then any customer order or processing task is assigned to a dedicated server (such as the hardware identifier 240, the MAC address 242, and/or the VPN connection 230). However, if the customer does not have an assigned VLAN, then the hardware identifier 240, the MAC address 242, and/or the VPN connection 230 is submitted for the dynamic burn slot allocation service. However, if this is not the first boot, then the hardware identifier 240, the MAC address 242, and/or the VPN connection 230 is determined.

Figure 9:
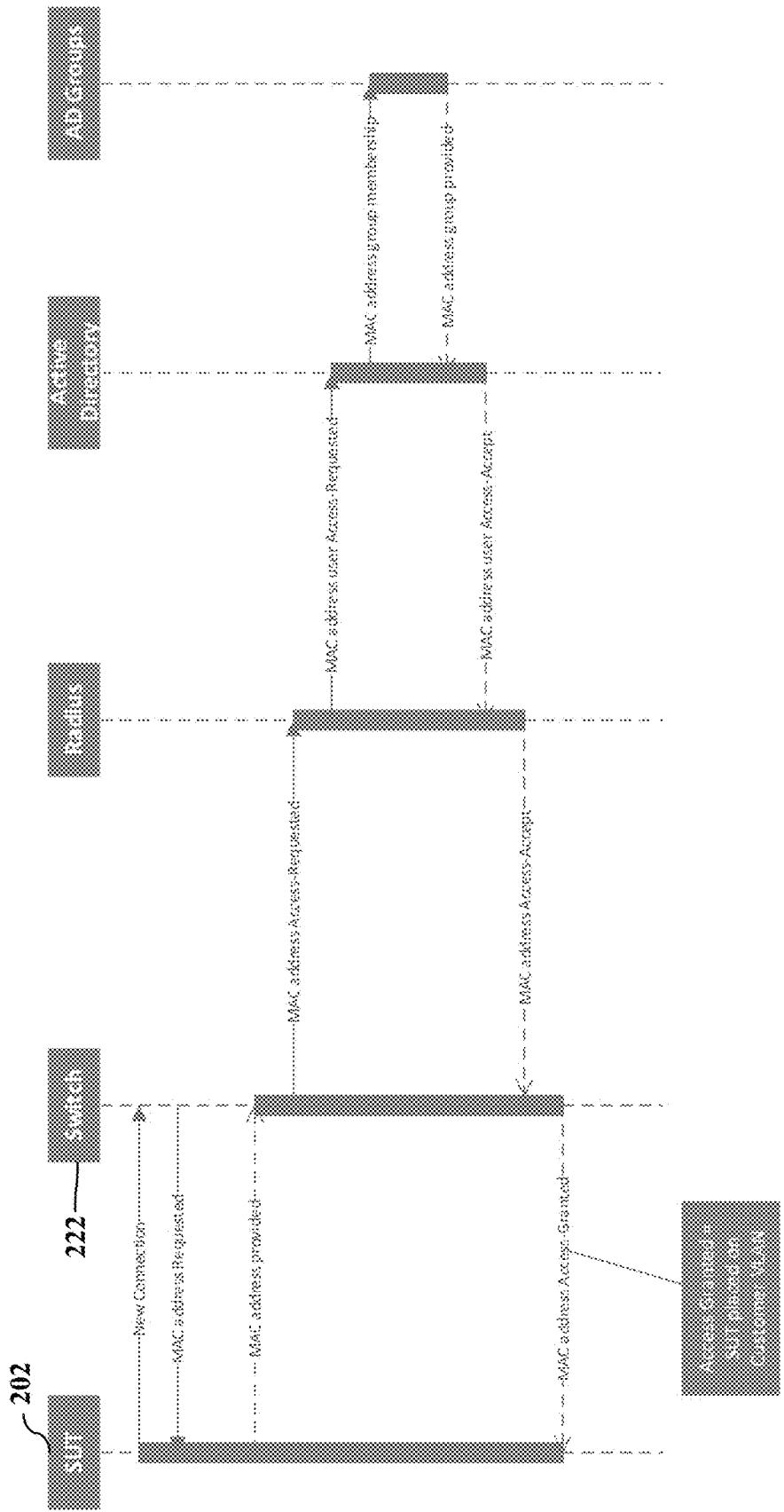
FIGS. 9-10 illustrate discovery of a MAC address, according to exemplary embodiments.
Figure 10:
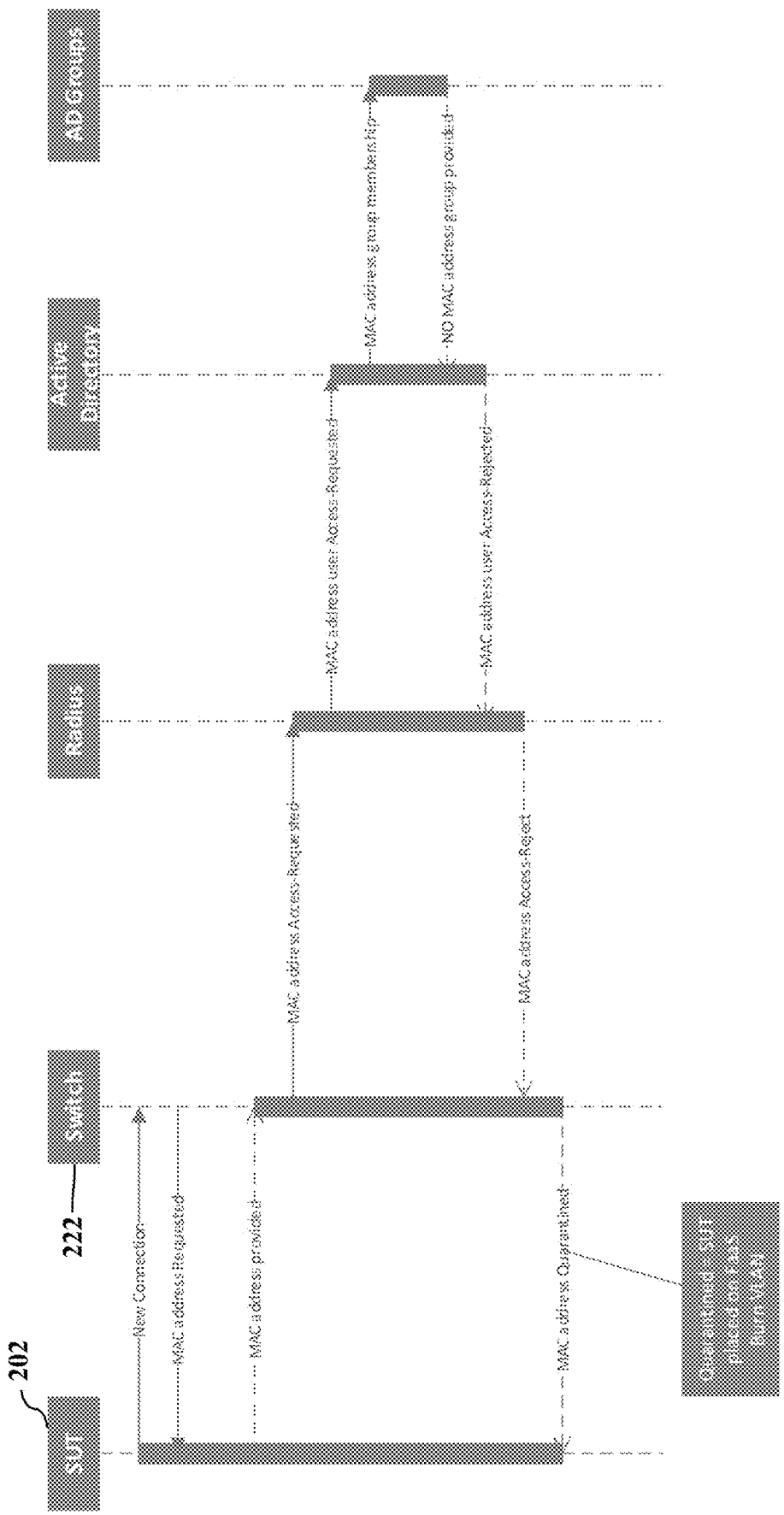

FIGS. 9-10 illustrate discovery of the MAC address 242, according to exemplary embodiments. Exemplary embodiments may thus switch the switch ports 224 in the Ethernet switch 222 to a particular virtual private network (or VPN connection 230). FIG. 9 illustrates a successful discovery, while FIG. 10 illustrates a failed discovery. For example, the IEEE 802 family of standards may be used to allow the Ethernet switch 222 to dynamically change the VLAN based on the MAC address 242 in an active directory belonging to a VLAN group. Exemplary embodiments may also allow open-source implementation of the Preboot eXecution Environment (or iPXE) and a manufacturing operating system to auto discover the MAC address 242 and populate it to the electronic database 260.

Figure 11:
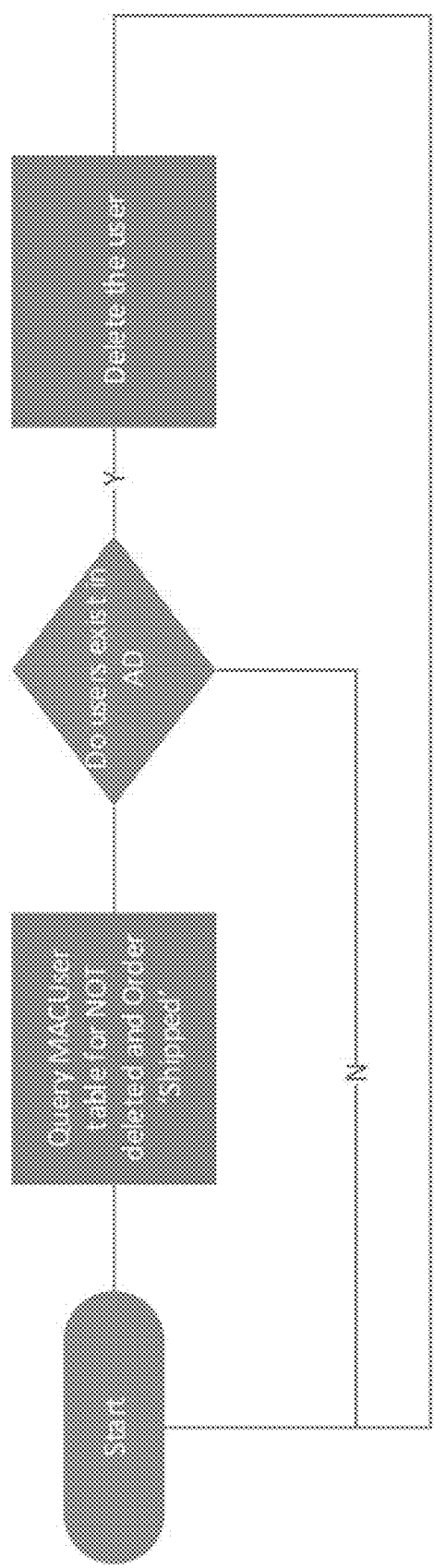
FIG. 11 illustrates periodic updates of the MAC address, according to exemplary embodiments.

FIG. 11 illustrates periodic updates of the MAC address 242, according to exemplary embodiments. As the customer device (such as the laptop computer 202 or a server) is inserted and then removed from the burn rack 224, exemplary embodiments may clean or purge old MAC addresses. Entries in the electronic database 260, for example, may be deleted or overwritten with fresh data. As the hardware identifier 240, the MAC address 242, and/or the VPN connection 230 change with time, exemplary embodiments may clean up any old/stale or orphaned entries. An Active Directory may thus be updated to store the current or active MAC addresses 254. A graphical user interface may also be used for administrative control to create and delete the MAC addresses 254.

Exemplary embodiments may also include cloud computing capabilities. With the development of cloud computing, exemplary embodiments may include customer accessible web services to provide for a virtual burn rack monitor that is accessible and configurable via the Internet. The dynamic burn rack allocator 220 may include a secure web service allowing any device to post updates on its current status (including completion and failure) thereby removing the need to have a manual check of each system for completion. The dynamic burn rack allocator 220 may include additional web services that allow the customer to validate a SUT is part of their order prior to configuration. If a system is placed within a customer environment and is not part of their order, then configuration would not be allowed and a failure message would be sent to the service providers burn rack monitor highlighting the error.

Exemplary embodiments may also include hashing. Once the hardware identifier 240, the MAC address 242, and/or the VPN connection 230 is known, exemplary embodiments may call, invoke, or apply an electronic representation of a hashing algorithm. The hashing algorithm thus generates a unique hash value representing the hardware identifier 240, the MAC address 242, and/or the VPN connection 230. Exemplary embodiments may then store the hash value in the electronic database 260 for reference.

Figure 12:
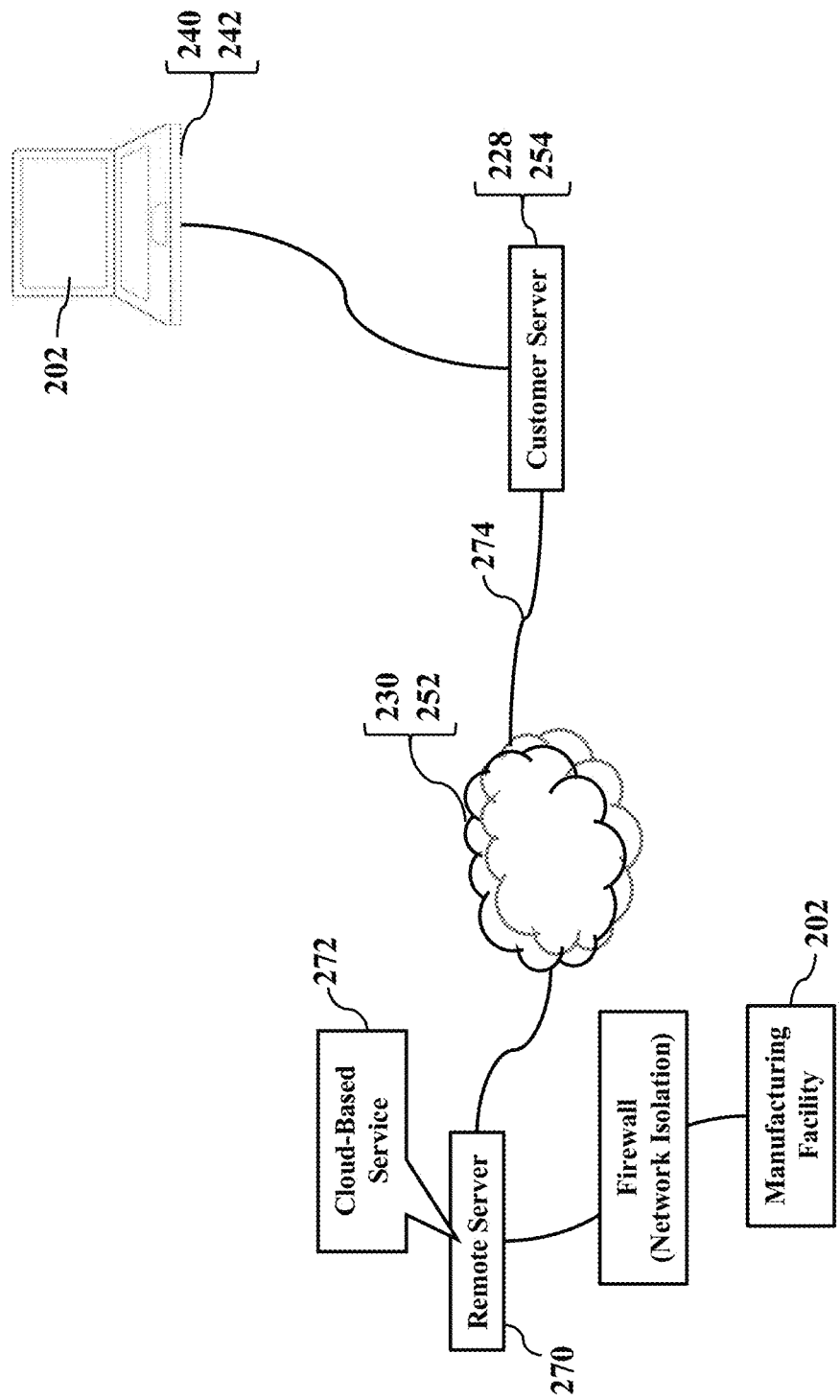
FIGS. 12-14 illustrate virtual burn rack monitoring, according to exemplary embodiments.
Figure 13:
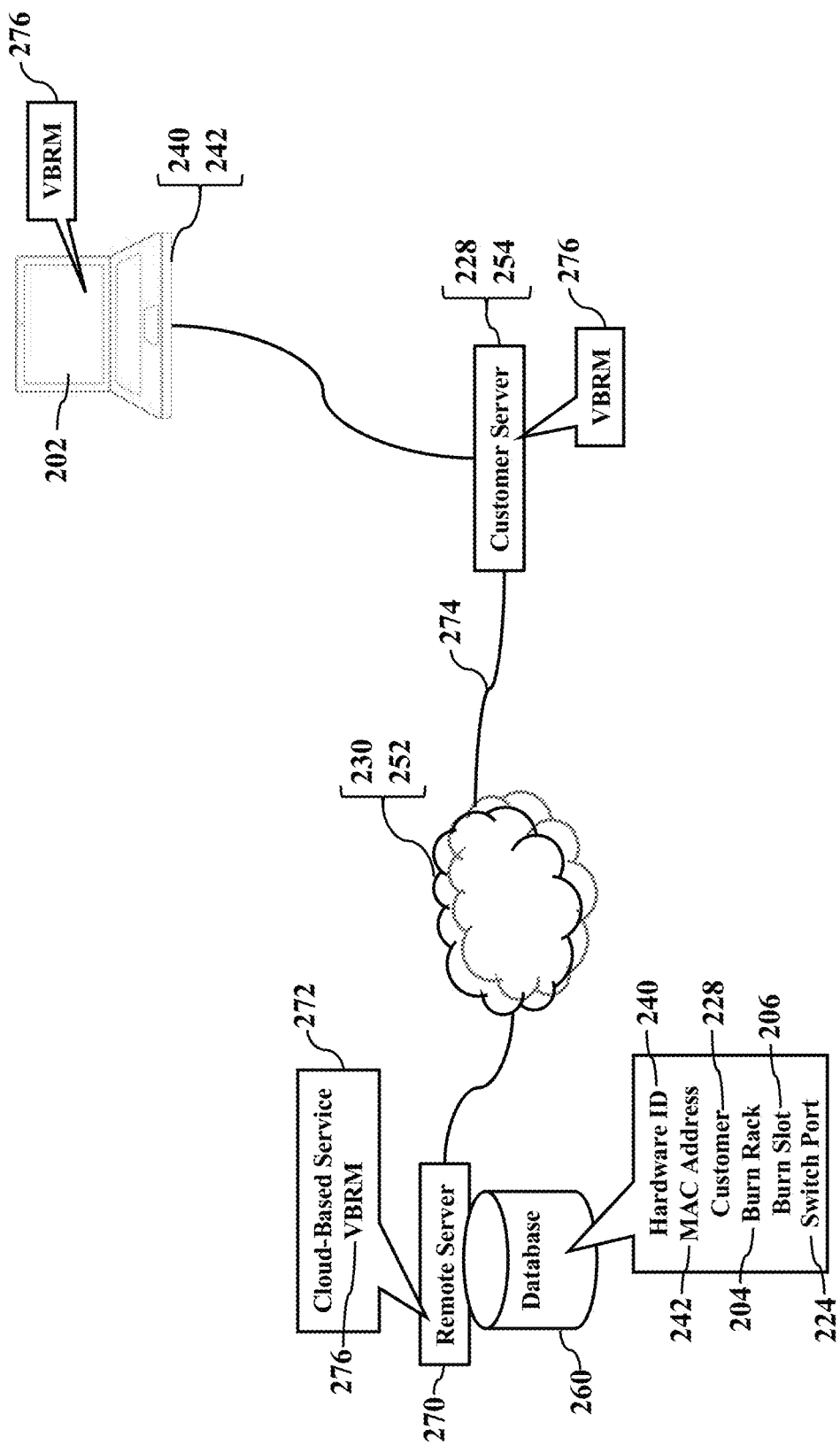
Figure 14:
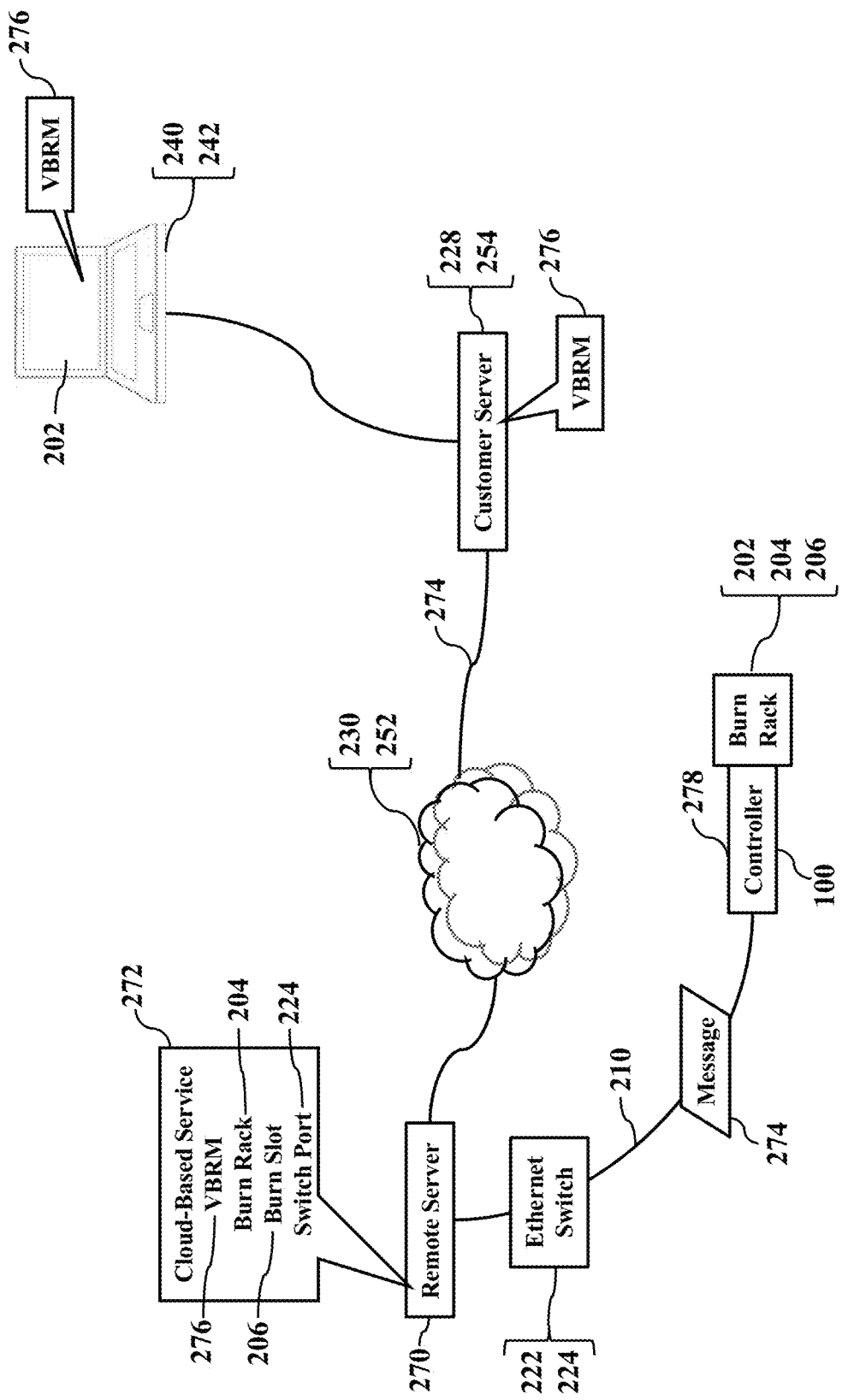

FIGS. 12-14 illustrate virtual configuration, according to exemplary embodiments. Here a remote server 270 provides a cloud-based service 272 that may be used for remote configuration from any location outside the manufacturing facility 200. Suppose, for example, that the laptop computer 202 is configured on-site at the customer's facility. Because the laptop computer 202 is configured on-site at the customer's location, the laptop computer 202 may be unable to establish a network connection to the manufacturing facility 200. That is, the customer's facility may be firewalled or otherwise network isolated and prevented from accessing the network infrastructure serving the manufacturing facility 200. The cloud-based service 272 thus allows the laptop computer 202 to signal manufacturing control systems at the manufacturing facility 200.

FIG. 12 thus illustrates a cloud-based solution. Here the remote server 270 provides the cloud-based service 272 that collects messages 274 from the customer's networking environment. While the customer 228 may have any networking environment, FIG. 12, for simplicity, again illustrates the customer's VPN connection 230 to the communications network 252. The laptop computer 202 thus interfaces with the customer server 254 operated by, or on behalf of, the customer 228. Whenever the laptop computer 202 operates, the laptop computer 202 may send the message 274 to the customer server 254, and the customer server 254 may send or forward the message 274 via the customer's VPN connection 230 to the communications network 252 and to the remote server 270. While the message 274 may have any content or information, the message 274 may particularly describe a status, result, or outcome of a test. Moreover, the message 274 may also specify the corresponding hardware identifier 240 and the MAC address 242. The customer 228, in other words, may voluntarily choose and post any data or information desired to the cloud-based service 272 provided by the remote server 270. Once the remote server 270 is informed of the posted data, that data is then accessible to the manufacturing facility 200.

The cloud-based service 272 overcomes network isolation. Even though the laptop computer 202 may be unable to establish a network connection to the manufacturing facility 200, the cloud-based service 272 provides an architecture for contacting technicians and others behind the network-secure manufacturing facility 200. The laptop computer 202 may thus use the customer's VPN connection 230 to report the messages 274 to the cloud-based service 272. So, even if the laptop computer 202 is remotely configured on-site at the customer's location, the laptop computer 202 may still alert or notify the manufacturing control systems at the manufacturing facility 200.

FIG. 13 illustrates more details for burn rack monitoring, according to exemplary embodiments. Once the message 274 is received by the remote server 270, the cloud-based service 272 uses the hardware identifier 240 and the MAC address 242 to select the corresponding customer environment. The laptop computer 202 and/or the customer server 254 may have a hardware processor and solid-state memory device (not shown for simplicity) that stores and executes a client-side version of a virtual burn rack monitor (or VBRM) application 276. The remote server 270 may also have a hardware processor and solid-state memory device (not shown for simplicity) that stores and executes a server-side version of the virtual burn rack monitor application 276. The client-side version and the server-side version of the virtual burn rack monitor application 276 are thus software, instructions, or code that cooperate to report/post the messages 274 to the cloud-based service 272. Once any message 274 is received, the virtual burn rack monitor application 276 inspects the message 274 for the hardware identifier 240 and the MAC address 242. The virtual burn rack monitor application 276 may then instruct the remote server 270 to query the electronic database 260.

The customer environment may be identified. Recall that the hardware identifier 240 and/or the MAC address 242 is permanently associated/logged to the laptop computer 202, thus revealing its manufacturing records (e.g., assembly date, hardware and software configuration, and customer details). Once the hardware identifier 240 and/or the MAC address 242 are determined (perhaps as specified by the message 274), the virtual burn rack monitor application 276 may then use the hardware identifier 240 and/or the MAC address 242 to reverse lookup any manufacturing details. While the electronic database 260 may thus be a rich repository of informational content, FIG. 13 continues with only a simple explanation. That is, the virtual burn rack monitor application 276 queries for the hardware identifier 240 and/or the MAC address 242 and identifies or retrieves the entries that identify the customer 228 and its specific burn rack 204. Indeed, the entries in the electronic database 260 may even reveal the switch port 224 in the Ethernet switch 222 that is communicatively coupled to the burn rack 204 and/or to the particular burn slot 206.

FIG. 14 illustrates routing. Once the customer 228 and its specific burn rack 204 are known, the cloud-based service 272 may forward or send the message 274 to the appropriate personnel responsible for that customer 228. The remote server 270, for example, may instruct the Ethernet switch 222 to route the message 274 via the switch port 224 to an address associated with a controller 278 responsible for the burn rack 204. The controller 278 is another version or instance of the information handling system 100 that manages the burn rack 204. When the controller 278 receives the message 274, the controller 278 processes and disseminates the message 274. As a simple example, suppose the controller 278 processes the message 274 for display by a display device (not shown for simplicity). Any technicians or other personnel may view the message 274 and be notified of its informational content (such as a status, result, or outcome of a test).

Exemplary embodiments overcome network isolation. The remote server 270 providing the cloud-based service 272 allows monitoring of customer messages 274. Once the message 274 has been received at the cloud interface to the remote server 270, exemplary embodiments determine a location of the system under test and the appropriate network destination (such as the controller 278 of the burn rack 204) within the manufacturing facility 202. The electronic message 274 is thus available to the technicians working the manufacturing floor. The electronic message 274 describes any status, result, or outcome of a test, such as start, pass, fail, waiting, or some other custom-specified message.

The virtual burn rack monitor 276 allows for messaging to be passed to the manufacturing facility 200 by sending the appropriate customer's data (posted via the electronic message 274) over the customers Internet VPN connection 230 to the cloud-based service 272. Once that update has been received at the cloud interface to the remote server 270, the remote server 270 executes the cloud-based service 272 to determine the exact cell location (such as the burn slot 206) of the System Under Test and the appropriate updates can be related to the controller 278 of the burn rack 204. The cloud-based service 272 thus greatly improves manufacturing efficiency by automating notification of completeness or failure during the customer defined customization steps.

Exemplary embodiments may also include hashing. Once the hardware identifier 240, the MAC address 242, and/or the VPN connection 230 is known, exemplary embodiments may call, invoke, or apply an electronic representation of a hashing algorithm. The hashing algorithm thus generates a unique hash value representing the hardware identifier 240, the MAC address 242, and/or the VPN connection 230. Exemplary embodiments may then store the hash value in the electronic database 260 for reference.

Exemplary embodiments may packetize. The information handling system 100 may interface with a local area network and/or a wide area network (such as the Internet). Messages and data may be packetized into packets of data according to a packet protocol, such as IP. The packets of data contain bits or bytes of data describing the contents, or payload, of a message. A header of each packet of data may contain routing information identifying an origination address and/or a destination address. There are many different known packet protocols, and the Internet Protocol is widely used, so no detailed explanation is needed.

Exemplary embodiments may be applied regardless of networking environment. Exemplary embodiments may be easily adapted to stationary or mobile devices having cellular, wireless fidelity (Wi-Fi®), near field, and/or Bluetooth® capability. Exemplary embodiments may be applied to mobile devices utilizing any portion of the electromagnetic spectrum and any signaling standard (such as the IEEE 802.11 family of standards, GSM/CDMA/TDMA or any cellular standard, and/or the ISM band).

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method, comprising:
    receiving, by a server, a message posted to a cloud-based service, the message specifying a media access control address and a hardware identifier associated with a device installed in the burn slot;
    querying an electronic database for both the media access control address and the hardware identifier, the electronic database electronically associating customers to media access control addresses and to hardware identifiers including the media access control address and the hardware identifier specified by the message posted to the cloud-based service;
    identifying a customer of the customers in the electronic database that is electronically associated with both the media access control address and the hardware identifier specified by the message posted to the cloud-based service;
    determining a virtual private network that is associated with the customer;
    determining an Ethernet switch port in an Ethernet switch that corresponds to the customer; and
    sending, by the server, the message posted to the cloud-based service to the device via the Ethernet switch port that corresponds to the burn slot.

2. The method of claim 1, further comprising determining a virtual private network that corresponds to the burn slot the electronic database lacks an entry that corresponds to the media access control address.

3. The method of claim 1, further comprising instructing the Ethernet switch to route packets of data associated with the message via the Ethernet switch port.

4. The method of claim 1, further comprising instructing the Ethernet switch to route the message via the Ethernet switch port.

5. The method of claim 4, further comprising instructing the Ethernet switch to route packets of data associated with the message via the Ethernet switch port.

6. The method of claim 1, further comprising retrieving the hardware identifier specified by the message.

7. The method of claim 1, further comprising determining a service tag that is associated with the hardware identifier.

8. An information handling system, comprising:
    a hardware processor; and
    a memory device, the memory device storing instructions, the instructions when executed causing the hardware processor to perform operations, the operations including:
    receiving a message posted to a cloud-based service, the message specifying a hardware identifier and a hardware identifier associated with a device installed in a burn slot;
    querying an electronic database for both the media access control address and the hardware identifier, the electronic database electronically associating customers to media access control addresses and to hardware identifiers including the media access control address and the hardware identifier specified by the message posted to the cloud-based service;
    identifying a customer of the customers in the electronic database that is electronically associated with both the media access control address and the hardware identifier specified by the message posted to the cloud-based service;
    determining a virtual private network that is associated with the customer;
    determining an Ethernet switch port in an Ethernet switch that corresponds to the customer; and
    sending the message via the Ethernet switch port to the device installed in the burn slot.

9. The information handling system of claim 8, wherein the operations further include quarantining the device installed in the burn slot.

10. The information handling system of claim 8, wherein the operations further include instructing the Ethernet switch to route packets of data associated with the message via the Ethernet switch port.

11. The information handling system of claim 8, wherein the operations further include determining a service tag associated with the device.

12. The information handling system of claim 8, wherein the operations further include mapping the hardware identifier to the burn slot.

13. The information handling system of claim 8, wherein the operations further include mapping the hardware identifier to the Ethernet switch port.

14. The information handling system of claim 8, wherein the operations further include routing the message to a network address associated with the burn rack.

15. A solid-state memory device storing instructions that when executed cause a hardware processor to perform operations, the operations including:
   receiving a message posted to a remote server providing a cloud-based service, the message specifying a media access control address and a hardware identifier associated with a device installed in a burn slot;
   querying an electronic database for both the media access control address and the hardware identifier, the electronic database electronically associating customers to media access control addresses and to hardware identifiers including the media access control address and the hardware identifier specified by the message posted to the cloud-based service;
   identifying a customer of the customers in the electronic database that is electronically associated with both the media access control address and the hardware identifier specified by the message posted to the cloud-based service;
   determining a virtual private network that is associated with the customer;
   determining an Ethernet switch port in an Ethernet switch that corresponds to the customer; and
   sending the message from the remote server via the Ethernet port in the Ethernet switch to the device installed in the burn rack.

16. The solid-state memory device of claim 15, wherein the operations further include mapping the hardware identifier to the customer.

17. The solid-state memory device of claim 15, wherein the operations further include mapping the hardware identifier to the burn rack.

18. The solid-state memory device of claim 15, wherein the operations further include hashing the hardware identifier.

19. The solid-state memory device of claim 15, wherein the operations further include quarantining the device.

20. The solid-state memory device of claim 15, wherein the operations further include determining the Ethernet switch port that is associated with the customer.

* * * * *